ions in the di3,101,297
DIAPER WASHING COMPOSITION
Joseph Hack, Baltimore, Md., assignor to Sir Properties, Inc., a corporation of Maryland
No Drawing. Filed May 15, 1961, Ser. No. 109,876
3 Claims. (Cl. 167—30)

This invention relates to a diaper washing composition.

An object of the present invention is to provide a washing composition for baby diapers that will both clean and fluff the diapers.

Another object of the present invention is to provide a washing composition for baby diapers that will prevent diaper rash and related discomforts. Furthermore, introduction of the present invention will serve to eliminate already existing diaper rash and irritation.

Still another object of the present invention is to provide a washing composition for baby diapers, which will kill certain bacterial organisms in the diapers that cause diaper rash.

A further object of the present invention is to provide a washing composition for baby diapers which will kill other bacterial organisms in the diapers that cause odors.

An additional object of the present invention is to provide a washing composition for baby diapers which makes the diapers more absorbent than before washing and thus remain drier and correspondingly reduces irritation in use.

Still another object of the present invention is to provide a washing composition for baby diapers which makes the diapers very soft, thereby reducing the tendency of same to cause irritation when used.

Further purposes and uses of the present invention are the cleansing and deodorizing of clothing, bed-sheets, blankets from sick beds and sanitizing toys, walls, floors, carpets, rugs, mattresses, and in fact all forms of cloth, leather, plastic, metal or glass objects.

To make 100 lbs. or approximately 220 kilograms of the composition, the following procedure is herewith detailed and has been found to be critical: In one container dissolve in water 100 grams of the stilbene derivative known as "HS-76" in 102.5 liters of water. This is a commercial product available from the Antara Chemical Company. The function of this ingredient in the composition is as an optical bleach, to remove stains and impart to the diapers a whiter and brighter appearance.

While vigorously agitating the above solution, add 22 kilograms of the alkyphenol polyglycol ether known as "Neutronyx 600" whose chemical formula is:

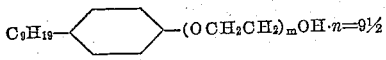

This is a commercial product manufactured by Onyx Chemicals, Inc. It is a non-ionic detergent. The function of this ingredient in the composition is to act as a wetting, emulsifying, and dispersing agent, and, of course, a detergent.

At the same time add 7.7 kilograms of "Aerotex Purifying Agent" No. 1. This is a commercial product manufactured by American Cyanamid Company. It contains certain cationic material materials which stabilize neomycin sulphate.

The exact formula of this chemical composition is not known but it is believed to contain 1.6% of neomycin sulphate and the probable formula is $C_{29}H_{58}N_8O_{16} \cdot SO_4$. The function of this ingredient in the composition is further to reduce odors, particularly ammonia odors, and to kill bacteria.

Also, at the same time, add 6.6 kilograms of "Zelcon C." This is a commercial product manufactured by the Du Pont Company. It contains material of a fatty nature. The constituency is N,N,N',N' tetrakis (2-hydroxy propyl) diamino dioleate methosulphate. The function of this ingredient in the washing composition is as a fluffing agent, a detergent, an anti-bacterial and anti-static agent. It further makes the diapers more water absorbent.

After the above ingredients have been thoroughly mixed, a second solution is made. In another container, dissolve 8.8 kilograms of tetrapotassium pyrophosphate

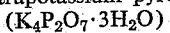

in 46.25 liters of water. The function of this ingredient in the composition is as a water softener and cleansing agent. Then add this solution to the contents of the first container.

In a third container, dissolve 3 grams of any suitable coloring agent in 8.8 liters of water. "Sevron Blue," a commercial product made by the Du Pont Company, has been found quite suitable for the desired purpose. The function of this ingredient is to impart a pleasing color to the composition. This solution is now added to the contents of the first container.

While continuing vigorous agitation of the solution, 100 grams of any suitable perfume is added. The perfume known as "Delicate Bouquet" No. 26,529, made by Fritzsche Brothers, has been found to be quite desirable. The purpose of this ingredient is to impart a pleasing odor to the composition.

The final step in the preparation of the composition is the addition of 17.6 kilograms of an n-alkyl dimethyl benzyl ammonium chloride wherein the n-alkyl may be $C_{12}H_{25}$, $C_{14}H_{29}$, $C_{16}H_{33}$, and/or $C_{18}H_{37}$. It is a cationic, surface active, n-alkyl ammonium salt of high biocidal activity. This ingredient functions as the quaternary component of the composition.

As previously stated, the above procedure has been found to be critical with the exception that the times of mixing the ingredients are not important. The only requirement here is that they should be thoroughly mixed until all of the ingredients are in solution.

The above described procedure will result in a sparkling clear solution. While the foregoing preparation has, through experimentation, been found to produce the best possible end product, deviations of up to 30% in the amounts of the several ingredients will still result in a workable diaper washing composition.

In use the composition is added to the water in which the diapers are to be washed in the amount of 4 teaspoons to the gallon. When diapers are washed in water containing the composition according to the invention, ammonia forming and odor producing bacteria are eliminated from same. Also, the new finish and fluffy nature of the diaper material is preserved and accordingly the common causes of diaper rash are eliminated.

The above specification is to be taken as illustrative of the inventive concept thereof, and is not meant to be limiting, the invention being limited only by the scope of the appended claims.

I claim:

1. The process of making an anti-bacterial washing composition which comprises mixing a first solution of approximately 9% of a bleaching component, .7% of a cationic stabilizing component for neomycin sulphate, .6% of N,N,N',N' tetrakis (2-hydroxy propyl) diamino dioleate methosulphate and 89% water, mixing a second solution of 2% tetra-potassium pyrophosphate and 98% water, combining the two solutions into a composition of 65.5% by weight of the first and 24.4% by weight of the second in the final volume, and adding to the combined solutions an n-alkyl dimethyl benzyl ammonium chloride in an amount of approximately 10% by weight of the final volume.

2. An anti-bacterial washing composition comprised by a mixture in approximately 65.5% by weight of the final volume of a first solution of approximately 9% of a bleaching component, .7% of a cationic stabilizing component for neomycin sulphate, and .6% of N,N,N',N' tetrakis (2-hydroxy propyl) diamino dioleate methosulphate in 89% water, a second solution of approximately 24.5% by weight of the final volume of 2% tetra-potassium sulphate in 98% water, and 10% by weight of the final volume of an n-alkyl dimethyl benzyl ammonium chloride.

3. An anti-bacterial washing composition comprised by a mixture of a first solution of approximately 62.5% by weight of the final volume of approximately 9% of a bleaching component, .7% of a cationic stabilizing component for neomycin sulphate, and 6% of N,N,N',N' tetrakis (2-hydroxy propyl) diamino dioleate methosulphate in 89% of water, a second solution of approximately 23.3% by weight of the final volume of 2% tetra-potassium sulphate in 98% water, 10% by weight of the final volume of an n-alkyl dimethyl benzyl ammonium chloride, a third solution of approximately 4% by weight of the final volume of 10% of a coloring agent in 99% water, and approximately .5% by weight of the final volume of an odor imparting agent.

References Cited in the file of this patent

UNITED STATES PATENTS

| | | |
|---|---|---|
| 2,634,229 | De Wet | Apr. 7, 1953 |
| 2,643,969 | Mahon | June 30, 1953 |
| 2,702,780 | Lerner | Feb. 22, 1955 |
| 2,730,483 | Mast et al. | Jan. 10, 1956 |
| 2,801,201 | Kipnis | July 30, 1957 |
| 2,822,314 | Ferlauto et al. | Feb. 4, 1958 |
| 2,830,011 | Parker | Apr. 8, 1958 |
| 2,856,330 | Vagenius | Oct. 14, 1958 |
| 2,926,119 | Niederhauser | Feb. 23, 1960 |
| 2,951,766 | White | Sept. 6, 1960 |
| 2,951,787 | Lo Cicero et al. | Sept. 6, 1960 |
| 2,951,788 | Chien-Pen Lo et al. | Sept. 6, 1960 |

OTHER REFERENCES

"Water Bugs in the Bassinet" (Editorial), A.M.A.—American Journal of Diseases of Children, vol. 101, No. 3, pages 273–277, March 1961.

Dale et al.: "Effectiveness of Preservatives in Commercial Ophthalmic Preparations," J. Am. Pharm. Assoc., Prac. Phy. Ed., vol. 20, No. 1, pp. 32–35, January 1959.

Plotkin et al.: "Bacteremia Caused by Pseudomonas sp. Following the Use of Materials Stored in Solutions of a Cationic Surface-Active Agent," Am. J. M. Sc., vol. 235, No. 6, pp. 621–627, June 1958.

Hyamines 1622 and 10–X, Rohm and Haas Co., 1947, 16 page booklet.

Benson: "New Treatment for Diaper Rash," J. Pediatrics, October 1947, vol. 31, No. 4, pages 369–374.